G. A. STEVENS.
CORN HUSKER.
APPLICATION FILED APR. 3, 1913.

1,068,285.

Patented July 22, 1913.

WITNESSES
Geo. V. Naylor
Walton Harrison

INVENTOR
George A. Stevens
BY Munn & Co
ATTORNEYS

G. A. STEVENS.
CORN HUSKER.
APPLICATION FILED APR. 3, 1913.
1,068,285.
Patented July 22, 1913.
2 SHEETS—SHEET 2.
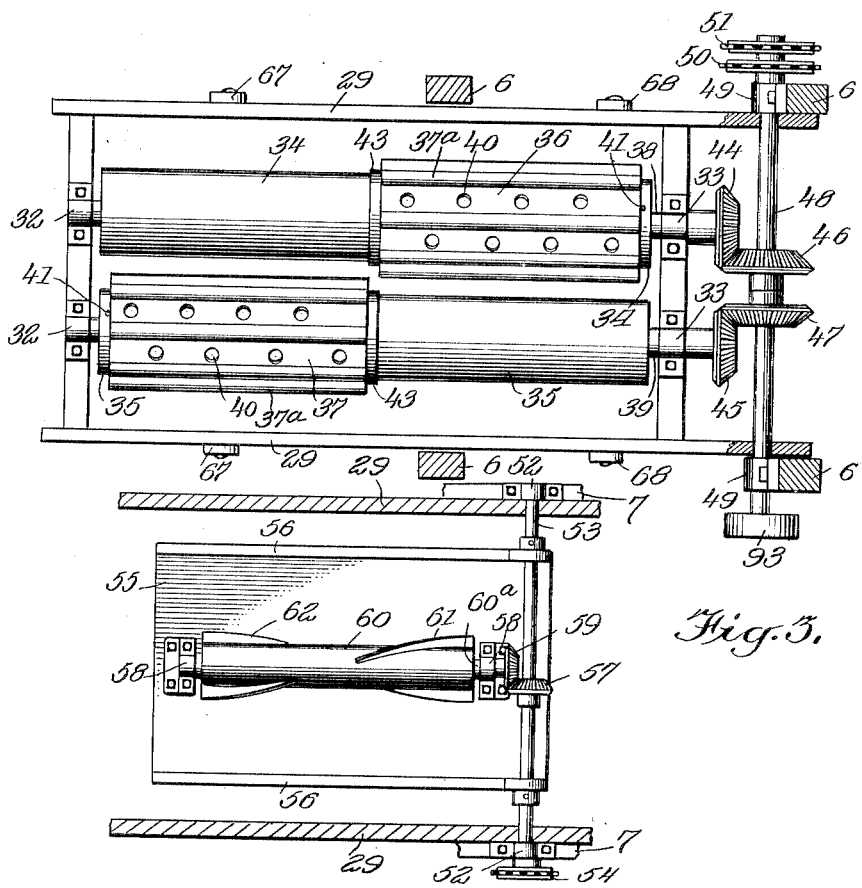
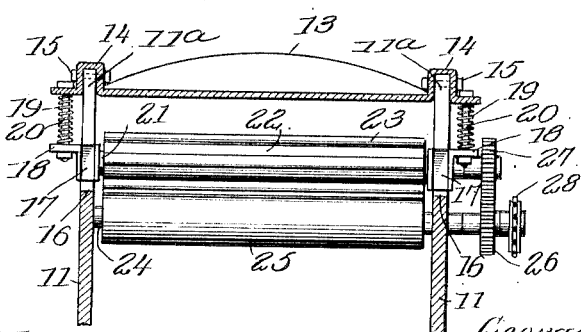
INVENTOR
George A. Stevens
BY Munn & Co
ATTORNEYS
WITNESSES

UNITED STATES PATENT OFFICE.

GEORGE A. STEVENS, OF ELGIN, ILLINOIS.

CORN-HUSKER.

1,068,285.  Specification of Letters Patent.  Patented July 22, 1913.

Application filed April 3, 1913. Serial No. 758,606.

*To all whom it may concern:*

Be it known that I, GEORGE A. STEVENS, a citizen of the United States, and a resident of Elgin, in the county of Kane and State of Illinois, have made certain new and useful Improvements in Corn-Huskers, of which the following is a specification.

My invention relates to corn huskers of the kind generally used in connection with feed cutters for the purpose of separating ears of corn from the stalks, and removing the husks from said ears of corn at the same time that the stalks are fed to the cutting mechanism, one form of such device being shown in my Patent No. 561,450 dated June 2, 1896.

More particularly stated my invention comprehends a corn husking device of the type above indicated and in which I seek to make various improvements relating more especially to the manner in which the husks are removed from the ears and in which the ears are separated from the stalks and fodder.

Among the various specific objects sought to be accomplished by my improvements are the following:—I. To provide improved snapping roller mechanism for grasping the stalk and fodder and pulling the latter away from the ear. II. To provide improved husking rollers for grasping and opening husks and pulling the same away from the grain portion of the ears. III. To provide retarding mechanism for preventing undue rapidity in the travel of the ears as they pass by gravity along the husking rollers.

Besides the foregoing I make divers improvements in the general construction of the machine, for the purpose of increasing the efficiency of the same.

Reference is made to the accompanying drawings forming a part of this specification, and in which like letters indicate like parts.

Figure 1 is a substantially central vertical section through my machine. Fig. 2 is a section on the line 2—2 of Fig. 1, showing more particularly the husking rollers and a portion of the gearing for driving the same. Fig. 3 is a section on the line 3—3 of Fig. 1 looking in the direction of the arrow, and showing the retarding roller and swinging frame for supporting the same. Fig. 4 is a section on the line 4—4 of Fig. 1, looking in the direction of the arrow. Fig. 5 is a detail showing in perspective one of the barrels for the husking rollers.

Mounted upon posts 6 are horizontal beams, one of which is shown at 7, and extending from one of these beams to the other is a cross bar 8. A guide board 9 likewise mounted upon the beams 7 is provided with a horizontal portion 10 which serves the purpose of a cross bar. A feed chute is shown at 11 and is provided with flaring portions 12 to facilitate the entrance of the stalks carrying the ears of corn. A hood 13 is mounted upon the feed chute and assists in guiding the passage of material therethrough. The hood 13 extends across the machine and is provided with portions 14, each having an inverted U-shape as will be understood from Fig. 4, these portions being fitted upon two portions $11^a$, extending upwardly from the sides of the feed chute 11, and being detachably held in position by bolts 15. The feed chute 11 is provided upon its opposite sides with slots 16, as indicated more particularly in Fig. 4, and slidably fitting into these slots are bearings 17 provided with ears 18 extending outwardly. Spiral springs 19 engage the ears 18 and extend upwardly therefrom to the adjacent portion of the hood 13. Guide ears 20 extend vertically through the spiral springs and also through the ears 18 and adjacent portions of the hood 13. By removing the bolts 15, the hood 13, bearings 17 and various other parts carried by said hood and said bearings may be readily removed from the machine. A shaft 21 extends through the bearings 17 and carries a roller $21^a$ (see Fig. 1) mounted rigidly upon it. Encircling this roller is a barrel 22 made of sheet metal, preferably steel, and provided with spring blades 23. The roller $21^a$, and its barrel 22 constitute a snapping roller. Below this snapping roller is a shaft 24, this shaft being journaled in the feed chute 11. A gear wheel 26 is mounted rigidly upon the shaft 24 and meshes with a gear wheel 27, the latter being mounted rigidly upon the shaft 21. A sprocket wheel 28 is mounted rigidly upon the shaft 24.

The husking roller frame is shown at 29 and is provided with end pieces 30, 31, and mounted upon the latter are bearings 32, 33.

The husking rollers are shown at 34, 35, and are for the most part smooth. Mounted upon the two husking rollers 34, 35, are barrels 36, 36, each made of sheet material, preferably spring steel, and provided with spring blades 37ª. Each of these blades is substantially semicircular in cross section. The general form of the barrels 36, 37, carried by the husking rollers is closely analogous to that of the barrel 22 carried by the upper snapping roller. The spring blades 37ª; because of their form, are specially adapted for pressing against the husks of the corn and pulling the same firmly but gently. The spring form of the blades enables them to obtain a good grip on the material of the husks without unduly mutilating the latter. This is also true of the spring blades 23 which are similarly enabled to grasp and pull firmly upon the stalks and fodder.

The husking rollers 34, 35, are mounted rigidly upon shafts 38, 39, which are supported by bearings 32, 33. The barrels 36, 37, are each provided with holes 40 which enable it to be fitted more easily upon the roller with which it is associated. Pins 41, 42 are employed for holding the barrels in position upon the husking rollers. Each husking roller 34, 35, is provided with an annular bead 43 encircling its middle, and serving as a limiting stop against which the end of the barrel is lodged. Mounted rigidly upon the shaft 38 is a bevel gear 44, and similarly mounted upon a shaft 39 is a bevel gear 45. These bevel gears mesh with bevel gears 46, 47, the latter being mounted rigidly upon a shaft 48. This shaft is supported by bearings 49 carried by the posts 6. Two sprocket wheels 50, 51, are mounted upon the shaft 48, as indicated in Fig. 2.

Mounted upon the beams 7 are two bearing 52 and journaled within the latter is a shaft 53, carrying at one of its ends a sprocket wheel 54. A frame 55 having the form of a flat board is provided with flanges 56 and is mounted loosely upon the shaft 53 and adapted for a limited swinging movement relatively to the framework. The shaft 53 carries a bevel pinion 57. The swinging frame 55 is provided with two bearings 58 and between these bearings is a roller 60 mounted rigidly upon a shaft 60ª, this shaft carrying a bevel pinion 59 secured rigidly upon it and meshing with the bevel pinion 57. The roller 60 is provided with spirally disposed blades 61, 62, and together with these blades constitutes a retarding roller for the purpose of preventing undue rapidity of travel of the ears of corn while being husked.

Mounted upon a shaft 63 (see Fig. 1 lower left hand corner) is a crank arm 64 which is connected with a pitman 65. This pitman is pivotally connected to a frame 66, this frame being supported by links 67, 68, and provided with side boards, one of which is shown at 69. The side boards are provided with downwardly extending triangular portions 70, and mounted upon the lower edges of these portions is a screen 71. The frame 66 carries a crate 72, the latter being provided with end bars 73, 74, and with a screen 75, as well as with baffle bars 76. The crate 72 is further provided with an opening 77 between the end bar 73 and the screen 75. The crate is held by frictional contact only in the swinging frame 66 and is easily detached from the latter. Just above the lower end of the screen 71 is an opening 78.

A conveyer chute having generally the form of a trough is shown at 79, and revolubly mounted within this chute is a conveyer screw 80 carried by a conveyer shaft 81. Mounted rigidly upon this shaft is a sprocket wheel 82, and engaging this sprocket wheel is a sprocket chain 83. A revoluble fan is shown at 84 and is provided with a sprocket chain 86 which is engaged by the sprocket chain 83. In operative relation to the fan 84 is a sprocket wheel 85, and engaging the latter is a sprocket chain 87. This sprocket chain also engages the sprocket wheel 54 and also a sprocket wheel 63ª, which drives the shaft 63. A sprocket chain 88 engages the sprocket wheel 85 and also the sprocket wheel 50. The sprocket wheel 51 engages a sprocket chain 92, the latter also engaging the sprocket wheel 28. The sprocket wheel 91 is mounted upon a revoluble shaft 90, which is supported in bearings, one of which is shown at 89. The shaft 90 is a part of the cutter mechanism for the stalks and fodder. This part of the device being old and well known, I will not describe. Mounted upon the shaft 48 is a driving pulley 93.

The operation of my device is as follows:—The stalks carrying the blades of fodder and the ears of corn are fed into the machine through the feed chute 11. Power being applied to the shaft 48, motion is transmitted through the various sprocket chains and gear members so as to actuate the various movable parts. The husking rollers 34 are turned inwardly at the top; that is to say, in such direction as to grasp the husks of the corn and to pull the same downwardly. The upper snapping roller turns in a contra-clockwise direction according to Fig. 1, the lower snapping roller turning in the opposite direction. The spring blades 23 coacting with the lower snapping roller grasp the fodder and stalks and pass the same out to the right according to Fig. 1. The ears of corn, being thus separated from the stalks, drop downwardly and pass endwise along the husking rollers. The spring blades of the barrels 36, 37, carried by the husking rollers facilitate the grip secured by the husking rollers upon the husks. As each barrel 36, 37, coacts with a smooth portion of the husking roller opposite, the husks are very effectively grasped and drawn downwardly. The retarding roller 60 is brought into engagement with the ears as they pass along the husking rollers, and the rotation of this roller is in such direction as to retard the rapidity of bodily travel of the ears thus being husked. That is to say, the spiral blades 61 are turned positively in such direction that the virtual travel of the spirals of the blades is in a direction contrary to the general longitudinal direction of travel of the ears of corn. By thus retarding the travel of the ears, the stripping of the husks is greatly facilitated and the thoroughness of the work is thereby enhanced. Moreover the retarding roller prevents the ears from becoming clogged at the point where the barrels of the husking rollers divide. The swinging of the frame 66 causes the husks to travel along toward the right of the machine where they are discharged from the top of the screen 71. The grains accidentally separated from the ears in husking drop through the screen 75 and pass downwardly through the opening 78 within reach of the conveyer screw 80. The fan 84 serves to remove trash and also to prevent the separate grains from passing to the left from the chute 79. The fan also facilitates the travel of the husks in that it blows them toward the right according to Fig. 1.

I do not limit myself to the precise construction shown, as variations may be made therein without departing from the spirit of my invention.

I claim:—

1. A device of the character described comprising a pair of husking rollers, one of said rollers being provided with a smooth surface, a barrel mounted upon the other of said husking rollers, said barrel being provided with spring blades each having a substantially semi-circular cross section, and means for turning said rollers in opposite directions.

2. A device of the character described comprising husking rollers and a pair of snapping rollers, one of said snapping rollers being smooth and the other being provided with spring blades, each of said spring blades having a substantially semi-circular cross section.

GEORGE A. STEVENS.

Witnesses:
F. A. WRIGHT,
GEO. BROWN, Jr.